United States Patent [19]

Feuvrier et al.

[11] Patent Number: 4,820,120
[45] Date of Patent: Apr. 11, 1989

[54] STATOR ASSEMBLY FOR THE FAN OF A MULTI-FLOW TURBO-JET ENGINE

[75] Inventors: Thierry Feuvrier, Noisy-le-Roi; Alexandre Forestier, Vaus Le Penil, both of France

[73] Assignee: Societe Nationale d'Etude et de Construction de Moteurs d'Aviation "S.N.E.C.M.A.", Paris, France

[21] Appl. No.: 63,431

[22] Filed: Jun. 18, 1987

[30] Foreign Application Priority Data

Jun. 18, 1986 [FR] France ............... 86 08775

[51] Int. Cl.⁴ .................... F01D 9/02
[52] U.S. Cl. .................... 415/189
[58] Field of Search ........... 415/189, 190, 216-218, 415/119, 137, 138; 416/500

[56] References Cited

U.S. PATENT DOCUMENTS

| 2,914,300 | 11/1959 | Sayre | 415/217 X |
| 2,924,425 | 2/1960 | Cutler | 415/217 |
| 2,925,998 | 2/1960 | Hayes et al. | 415/137 |
| 3,379,833 | 9/1967 | Bill et al. | 415/218 X |
| 3,588,267 | 6/1971 | Wilkinson et al. | 415/216 X |
| 4,500,255 | 2/1985 | Webb | 415/189 |

FOREIGN PATENT DOCUMENTS

| 879487 | 6/1953 | Fed. Rep. of Germany . |
| 967089 | 10/1957 | Fed. Rep. of Germany . |
| 1213423 | 3/1966 | Fed. Rep. of Germany ...... 415/217 |
| 970723 | 1/1951 | France ............... 415/217 |
| 2321616 | 3/1977 | France . |
| 52-68609 | 6/1977 | Japan ............... 415/189 |
| 599391 | 3/1948 | United Kingdom ............... 415/217 |
| 802508 | 10/1958 | United Kingdom . |

Primary Examiner—Robert E. Garrett
Assistant Examiner—Joseph M. Pitko
Attorney, Agent, or Firm—Oblon, Fisher, Spivak, McClelland & Maier

[57] ABSTRACT

The radially outer end of the aerofoil portion of each vane of a stator assembly for the fan of a turbo-jet engine is bent at right angles and is inserted in a slot-like opening provided in an outer ring which is fixed to the casing via screws in conjunction with spacers each of which has a foot which partly overlaps the adjacent opening.

3 Claims, 2 Drawing Sheets

STATOR ASSEMBLY FOR THE FAN OF A MULTI-FLOW TURBO-JET ENGINE

BACKGROUND OF THE INVENTION

1. Field of the Invention

The present invention relates to a stator assembly for the fan of a multi-flow turbo jet engine.

2. Summary of the Prior Art

With regard to known stator assemblies in which metallic vanes of the superalloy type are commonly used, the aim to reduce weight, particularly desirable in the field of turbo jet engines, has led to construction of vanes using either a light aluminum based alloy in laminated and folded form, or a composite material with a base of mineral or organic fibres.

In these cases there is a problem of fixing the vanes when forming the stator assembly of a fan, for which this type of vane is particularly suitable.

Certain elements of the solution are found in the prior art. FR No. 2321616 discloses a vane of which the radially inner end is embedded in an elastomeric sealant keyed in cut-away portions of an inner annular member. In this case the radially outer end of the vane comprises a platform fixed by bolts to an outer annular member.

However, this known method of fixing at the outer end is not suitable for vanes of the kind mentioned above and, besides, presents various drawbacks. At least two screws per vane must be used, and these must be tightened with a sufficiently high predetermined torque, which complicates assembly. Furthermore, this method of assembly leads to an accumulation of angular tolerances which can be the source of difficulties.

SUMMARY OF THE INVENTION

According to the present invention there is provided a multi-flow turbo-jet engine including a fan and a fan casing, wherein a stator assembly for the fan comprises an inner ring, an outer ring of sheet metal, means defining a plurality of slot-like openings disposed evenly around the circumference of said outer ring, and a stage of fixed vanes evenly arrayed between said inner and outer rings, said vanes each comprising an aerofoil portion and an angle portion which is bent at right angles to said aerofoil portion at the radially outer end thereof, said angle portion being inserted in one of said openings of said outer ring.

Preferably, the part of each vane which is bent at right angles is held clamped between the said outer ring and the fan casing by means of screws fixing the ring to the casing in association with spacers of which the foot portion partly overlaps the adjacent said opening in the ring as far as the aerofoil portion of the vane, and with seals between the screw heads and the spacers ensuring the fluid tightness of the gas flow path.

This arrangement, besides permitting a reduction in the mass of the stator assembly of the fan, reduces the number of screws used to one per vane, allows a moderate screw tightening torque to be used, simplifies assembly and facilitates maintenance. Any problem with angular tolerance is removed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
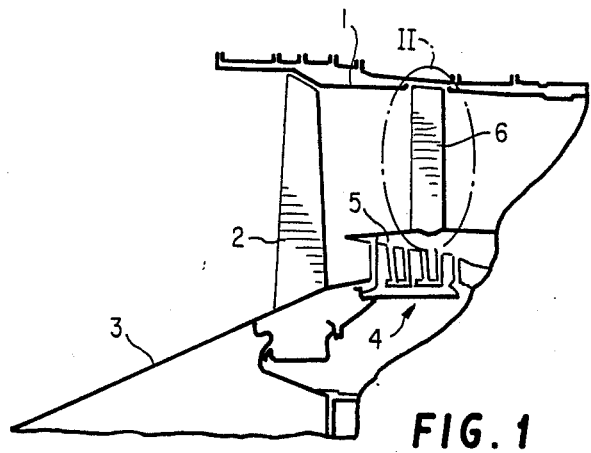
FIG. 1 is a half axial sectional view of the forward part of a twin flow turbo jet engine comprising a fan having a stator assembly in accordance with the invention.

The forward part of a twin flow turbo jet engine represented in FIG. 1 comprises a fan casing 1 within which is located a single-stage fan rotor 2 having its air inlet defined by the said casing 1 and a front cone 3. At the outlet of the rotor 2 the airflow is divided into a primary flow which enters a compressor 4, and a secondary flow through an annular secondary passage defined outwardly by the casing 1 and inwardly by an inner wall 5 surrounding the main part of the jet engine. In this secondary passage is located a stage of fixed vanes forming the stator assembly 6 of the fan.

Figure 2:
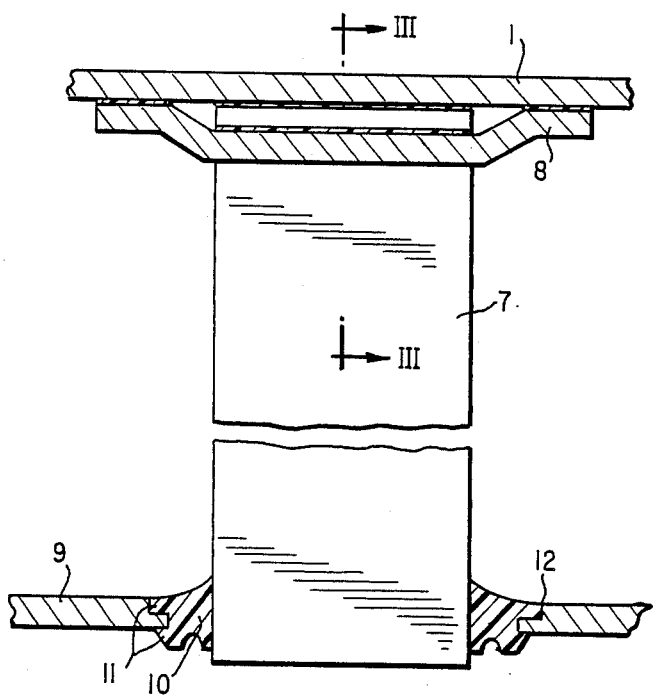
FIG. 2 is a view on an enlarged scale of the enclosed part II indicated in FIG. 1 showing in detail the mounting of a fixed vane of the stator assembly in accordance with the invention.

The detailed view of FIG. 2 shows the mounting of a vane 7 of the stator assembly 6 between a radially outer ring 8 and a radially inner ring 9. Inwardly the end of the aerofoil portion of the vane 7 is embedded in a seal 10 of elastomeric material which is keyed at 11 in a cut-out 12 of the inner ring 9. This seal 10 simultaneously ensures the fluid tightness of the gas flow path and the suppression of vibrations between the vane and the ring 9.

Figure 3:
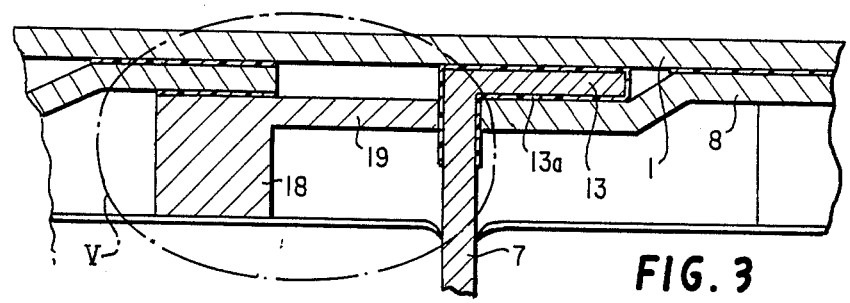
FIG. 3 is a fragmentary sectional view on the line III—III in FIG. 2 showing the radially outer part of the vane mounting.
Figure 4:
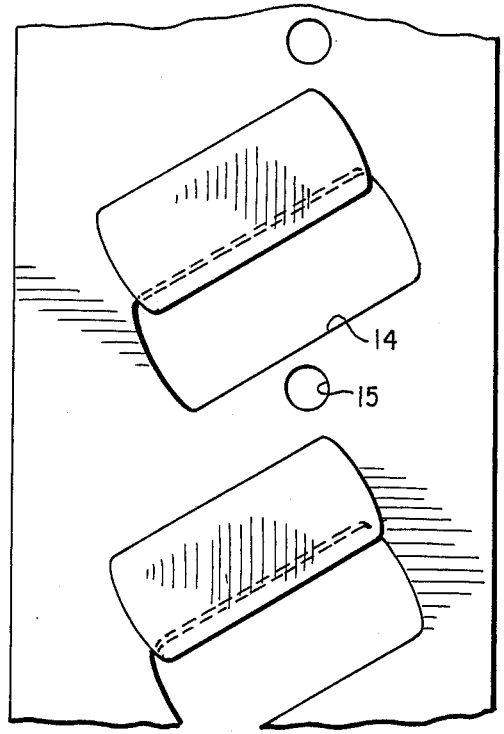
FIG. 4 is a fragmentary developed view showing the outer ring of the stator assembly of FIG. 2.
Figure 5:
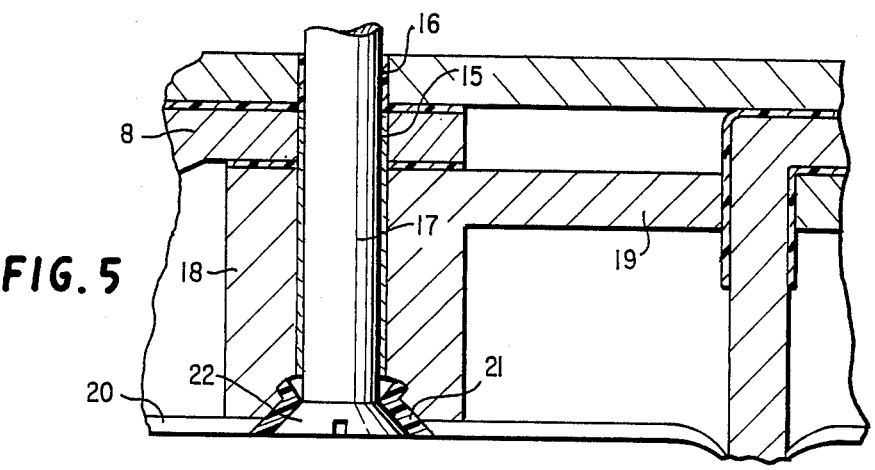
FIG. 5 is a view on an enlarged scale of the enclosed part V of FIG. 3 showing in detail the fixing of the outer ring of the stator to the fan casing.

For the outer end part of the vane 7, reference is made also to FIGS. 3, 4 and 5. The outer end part of the aerofoil portion of the vane 7 is bent at right angles to form a right angled portion 13 and comprises a vibration damper 13a moulded from a polymeric material of the silicone type. The sheet metal outer ring 8 comprises openings 14 (FIG. 4) in the form of slots into which are inserted the ends of the aerofoil portions of the vanes 7 so that the right angled portions 13 are positioned between the outer ring 8 and the inner surface of the fan casing 1. The outer ring 8 also comprises fixing holes 15 interposed between the openings 14, and the casing 1 comprises corresponding holes 16. Screws 17 extending through the holes 15 and 16 ensure the fixing of the ring 8 to the casing 1 as well as the fixing of spacers 18 located on the inner side of the ring 8 adjacent the holes 15.

FIG. 5 shows this fixing mechanism in detail. The spacers 18 on the face in contact with the ring 8 each comprise a foot 19 which partly overlaps the adjacent opening 14 and reaches to the wall of the aerofoil portion of the vane 7. On the opposite face of the spacers 18 the screws 17 also ensure the fixing of an annular element 20 which defines the outer profile of the gas flow path. A fluid tight seal 21 is located between the heads 22 of the screws 17 on the one hand, and the spacers 18 and the annular element 20 on the other hand. In this manner the fixing of the vanes 7 of the stator assembly and the various seals are ensured.

Obviously, numerous modifications and variations of the present invention are possible in light of the above teachings. It is therefore to be understood that within the scope of the appended claims, the invention may be practiced otherwise than as specifically described herein.

What is claimed is:

1. In a multi-flow turbo-jet engine including a fan and a fan casing,
a stator assembly for the fan, comprising:
an inner ring,
an outer ring of sheet metal placed on the inside of said fan casing,
means defining a plurality of slot-like openings disposed evenly around the circumference of said outer ring, and
a stage of fixed vanes evenly arrayed between said inner and outer rings,
said vanes each comprising:
an aerofoil portion, and
an angle portion which is bent at right angles to said aerofoil portion at a radially outer end thereof,
said angle portion being inserted in one of said openings of said outer ring.

2. In a multi-flow turbo-jet engine including a fan and a fan casing,
a stator assembly for the fan, comprising:
an inner ring,
an outer ring of sheet metal placed on the inside of said fan casing,
means defining a plurality of slot-like openings disposed evenly around the circumference of said outer ring, and
a stage of fixed vanes evenly arrayed between said inner and outer rings,
said vanes each comprising:
an aerofoil portion, and
an angle portion which is bent at right angles to said aerofoil portion at a radially outer end thereof,
said angle portion being inserted in one of said openings of said outer ring; and
fixing means operative to clamp said right-angle portion of each vane between the said outer ring and said fan casing,
said fixing means comprising:
screws fixing said outer ring to said casing,
spacers held by said screws against said outer ring,
each of said spacers having a foot portion which partly overlaps a cooperating one of said openings of said outer ring as far as said aerofoil portion of said vane inserted through said opening, and
seals disposed between the heads of said screws and said spacers ensuring fluid tightness of the gas flow path through said stator.

3. A turbo-jet engine according to claim 2, including an inner annular element which defines the outer profile of said gas flow path, wherein said fixing means comprises means for securing said inner annular element.

* * * * *

UNITED STATES PATENT AND TRADEMARK OFFICE
CERTIFICATE OF CORRECTION

PATENT NO. : 4,820,120
DATED : April 11, 1989
INVENTOR(S) : Feuvrier et al.

It is certified that error appears in the above-identified patent and that said Letters Patent is hereby corrected as shown below:

Column 1, line 8, change "turbo jet" to --turbo-jet--;
         line 12, change "superalloy type" to --superalloy-type;
         line 14, change "turbo jet" to --turbo-jet--;
         line 46, change "radially outer" to --radially-outer--.

Column 2, line 4, change "turbo jet" to --turbo-jet--;
         line 22, change "twin flo turbo jet" to --twin-flo turbo-jet--;
         line 34, change "radially outer" to --radially-outer--;
         line 35, change "radially inner" to --radially-inner-- and "Inwardly" to --Inwardly,--.

Column 3, line 24, change "radially outer" to --radially-outer--.

Column 4, line 11, change "radially outer" to --radially-outer--.

Signed and Sealed this

Fifteenth Day of May, 1990

Attest:

HARRY F. MANBECK, JR.

*Attesting Officer*   *Commissioner of Patents and Trademarks*